Patented July 19, 1932

1,868,473

UNITED STATES PATENT OFFICE

HERSCHEL G. SMITH, OF PORT ARTHUR, TEXAS, ASSIGNOR TO GULF REFINING COMPANY, OF PITTSBURGH, PENNSYLVANIA, A CORPORATION OF TEXAS

GREEN BLOOM OIL

No Drawing.  Application filed July 26, 1929.  Serial No. 381,398.

This invention relates to green bloom oils; and its comprises as a new composition of matter, a lubricating oil having a brilliant green bloom and containing a small proportion of a clarified residual oil resulting from heat treatment of petroleum oils with aluminum chlorid; and it further comprises a method of producing such green bloom oils wherein a petroleum oil, most advantageously a naphthenic gas oil, is distilled with aluminum chlorid until the residual oil amounts to only a small fraction of that originally charged, the oily residue thus produced is separated from accompanying coke, is clarified and is then used in small proportions for producing green bloom in lubricating oils; all as more fully hereinafter set forth, and as claimed.

Apart from naphthas and waxes, practically all transparent and translucent petroleum products are more or less dichroic or "fluorescent"; showing different colors by transmitted and reflected light. The reflected color in the art is usually known as "bloom". Lubricating oils which are yellow and red by transmitted light ordinarily show a bloom ranging from green, through blue to purple by reflected light. This range in color of the bloom is more or less independent of the transmitted color of the oil which may range from pale yellow to deep red. While I do not wish to commit myself to any theory as to the reason for the different colored blooms, it is my impression that the blue bloom oils differ from the green bloom oils in having some blackish asphaltic matter in colloidal suspension.

It is commercially desirable to convert blue bloom oils into green bloom oils and to impart green bloom to oils lacking it. This is done in the present invention. While I may use certain other materials, as more specifically set forth hereinafter, I most advantageously use a special material made by distilling a naphthenic distillate with aluminum chlorid until only about 10 per cent of the volume of the original oil remains as such, the rest being converted into low boiling hydrocarbons and coky by-products. This residual oil when separated from the accompanying coke and clarified is effective in imparting brilliant green bloom to lubricating oil. A similar preparation can be made with paraffin base distillates but it is not so good and in some cases carries sufficient paraffin to impart an objectionable haze to lubricating oil.

According to a specific embodiment of my invention, a gas oil distillate of the naphthenic type, advantageously ranging in gravity between 25° and 30° B., is charged to a still and subjected to distillation in the presence of from 2.5 to 3 per cent of anhydrous aluminum chlorid, by weight on the charge of oil used. The distillation is continued until the oil bottoms, exclusive of coke and solid aluminum chlorid hydrocarbon compounds, amount to about 10 per cent by volume of the charge to the still. The bottoms are cooled down by a pump circulation through a cooling coil and then delivered to a storage tank. Usually the time for such a run amounts to about 60 hours. All suspended aluminum chlorid-coke particles are allowed to settle out of the oil which has been delivered to the storage tank, and the oil is then removed for further use. The clarified oil thus produced is a dark brownish-green substance capable of imparting brilliant green bloom to lubricating oils when added thereto in small amounts, usually less than 1 per cent.

In using this oil, in accordance with my invention to impart green bloom to lubricating oils, an acid treated, sour lubricating oil is neutralized in the usual way by adding caustic soda solution to the oil while transferring it from the acid agitator to the wash tank. After such neutralization the bloom agent is then added in required amount, usually from 0.2 to 0.5 per cent by volume, while stirring. The oil is then washed and freed from soap by means of agitation with hot water, and then brightened and freed from any small amount of suspended water in the usual way. This washed oil then has the desired green bloom.

Any type of distillate when distilled with aluminum chlorid down to heavier bottoms gives a residual oil having green bloom imparting properties. Such residual oil is usually of a dark brownish-green color. The intensity of this color varies according to different types of distillate subjected to the aluminum chlorid distillation. The more nearly the charge approaches the true naphthene type of gas oil, the more potent is the green bloom agent produced. The bottoms or residual oils from aluminum chlorid distillation of paraffin type oils, although satisfactory are somewhat less effective in imparting green bloom to other oils. From 2 to 5 times as much of these bottoms are required to give a given bloom as of the bottoms from a selected naphthene gas oil. When a paraffin or mixed type of distillate, such as gas oil, is subjected to aluminum chlorid distillation, the residual oil contains an appreciable amount of paraffin wax so that there is a tendency to increase slightly the cloud test or the pour test of the lubricating oil with which it is used. This is somewhat aggravated by the need for using a larger proportion of such oil to impart the green bloom to lubricating oil than when residual oil from a naphthene oil distillation is used. The aluminum chlorid still residual oil from naphthene gas oil has the dual advantage of much higher green bloom imparting effect and the absence of paraffin wax.

The amount of agent used for imparting the green bloom to lubricating oil varies with the yield and corresponding concentration of the residual oil after an aluminum chlorid distillation. The desirable yield limits are from about 5 to 15 per cent by volume of the still charge.

The green bloom agent is sensitive to the action of sulfuric acid and for this reason I find it desirable to add the agent to the lubricating oil after it has been neutralized with caustic soda. The best stage for the addition of the green bloom agent is after the caustic soda treatment. The neutralized, unwashed oil has no action on the agent. The subsequent washing in the presence of a slight excess of alkali not only removes the soaps and scrubs the oil, but also removes solids and colloidal matter present in the green bloom agent. I find that if all the solids are not removed from the residual oil before it is used the additions of the bloom agent to the finished brightened oil in an appreciable amount sometimes results in the appearance of a very slight haze. This can be avoided when washing follows the addition of the bloom agent. It can be avoided also by a careful settling or by subjecting the residual oil from the aluminum chlorid distillation to a centrifugal. In this event the so treated residual oil may be added to any finished brightened oil, should it be desired.

The amount of agent added is so small that there is no appreciable effect on the quality of the oil from the standpoint of any of the usual physical tests. While the bloom agent is sensitive to light, there are no appreciable changes in the green bloom of an oil due to the action of light, or any change is so gradual (due probably to the extreme dilution) that no practical trouble is experienced from this standpoint.

While, as stated, I regard the residual oil from an aluminum chlorid distillation of high boiling oils as the best source of the bloom producing agent, other residual oils from treatment of hydrocarbons can be used. Lubricating oils and distillates may be heated with aluminum chlorid at temperatures below their boiling points for improvement in color with the production of exhausted or partially exhausted aluminum chlorid residues which are accompanied by a residual oil. Such residual oil when clarified may be used as an agent to impart green bloom to lubricating oil.

According to present information I regard the residual oil from aluminum chlorid distillation of a naphthenic gas oil as the best green bloom producing agent. But residual oils from paraffin base and semi-napthenic gas oils give good results.

What I claim is:—

1. A green bloom lubricating oil containing residual oil formed in treating petroleum products with aluminum chlorid.

2. A green bloom lubricating oil containing less than 1 per cent of clarified residual oil formed in treating petroleum products with aluminum chlorid.

3. A green bloom lubricating oil containing less than 1 per cent of clarified residual oil formed in the distillation of petroleum hydrocarbons with aluminum chlorid.

4. A green bloom lubricating oil containing clarified residual oil formed in the distillation of naphthenic distillates with aluminum chlorid.

5. A green bloom lubricating oil containing less than 1 per cent of residual oil formed in the distillation of naphthenic gas oil with aluminum chlorid.

6. The process of imparting green bloom to lubricating oils which comprises producing a residual oil as a result of the treatment of petroleum hydrocarbons with aluminum chlorid, acid treating and neutralizing lubricating oil, adding less than 1 per cent of said residual oil to the lubricating oil, and washing and brightening the lubricating oil.

7. The process of imparting green bloom to lubricating oils which comprises producing a residual oil as a result of the distillation of petroleum hydrocarbons with aluminum chlorid, and adding a small proportion thereof to acid treated and neutralized lubricating oils.

8. The process of imparting green bloom to lubricating oils which comprises producing a residual oil as a result of the distillation of naphthenic distillates with aluminum chlorid, and adding a small proportion thereof to acid treated and neutralized lubricating oils.

9. The process of imparting green bloom to lubricating oils which comprises producing a residual oil as a result of the distillation of naphthenic gas oil with aluminum chlorid, and adding a small proportion thereof to acid treated and neutralized lubricating oils.

10. The process of imparting green bloom to lubricating oil which comprises distilling a naphthene type of gas oil distillate with aluminum chlorid until the residual oil is about 10 per cent by volume of the original oil, cooling the residual oil and separating solids therefrom, and adding less than 1 per cent of said residual oil to acid treated and neutralized lubricating oil.

11. The process of imparting green bloom to lubricating oil which comprises adding to lubricating oil after it has been acid treated and neutralized, from 0.2 to 0.5 per cent by volume of clarified residual oil remaining after distillation of a naphthenic distillate with aluminum chlorid.

12. The process of imparting green bloom to lubricating oil which comprises adding to lubricating oil after it has been acid treated and neutralized, from 0.2 to 0.5 per cent by volume of clarified residual oil remaining after distillation of a naphthenic distillate with aluminum chlorid and then washing the oil free from soaps with water and freeing from suspended water.

In testimony whereof, I have hereunto affixed my signature.

HERSCHEL G. SMITH.